A. B. KINGSLAND.
OVEN SHELF.
APPLICATION FILED NOV. 27, 1909.

977,408. Patented Nov. 29, 1910.

Witnesses
W. A. Williams
S. L. Platka

Inventor
A. B. Kingsland
By Charles E. Allen
Attorney

UNITED STATES PATENT OFFICE.

ALLAN B. KINGSLAND, OF BURLINGTON, VERMONT.

OVEN-SHELF.

977,408. Specification of Letters Patent. Patented Nov. 29, 1910.

Application filed November 27, 1909. Serial No. 530,261.

*To all whom it may concern:*

Be it known that I, ALLAN B. KINGSLAND, a citizen of the United States, residing at Burlington, in the county of Chittenden and State of Vermont, have invented certain new and useful Improvements in Oven-Shelves, of which the following is a specification, reference being had therein to the accompanying drawing.

This invention relates to improvements in oven shelves, which are especially adapted for that type of oven known as portable ovens, and is intended for use in that form of oven which has a hot air flue surrounding it.

The object of my invention is to increase the baking quality of continuous flue construction by providing cross-head air flues extending under and above the supporting shelves thus providing continuous hot air flues for the conveyance of heated air at or immediately adjacent the point of contact with the article to be baked, so that a greater and more uniformly heated baking surface is provided on all sides of the article being baked.

Figure 1:
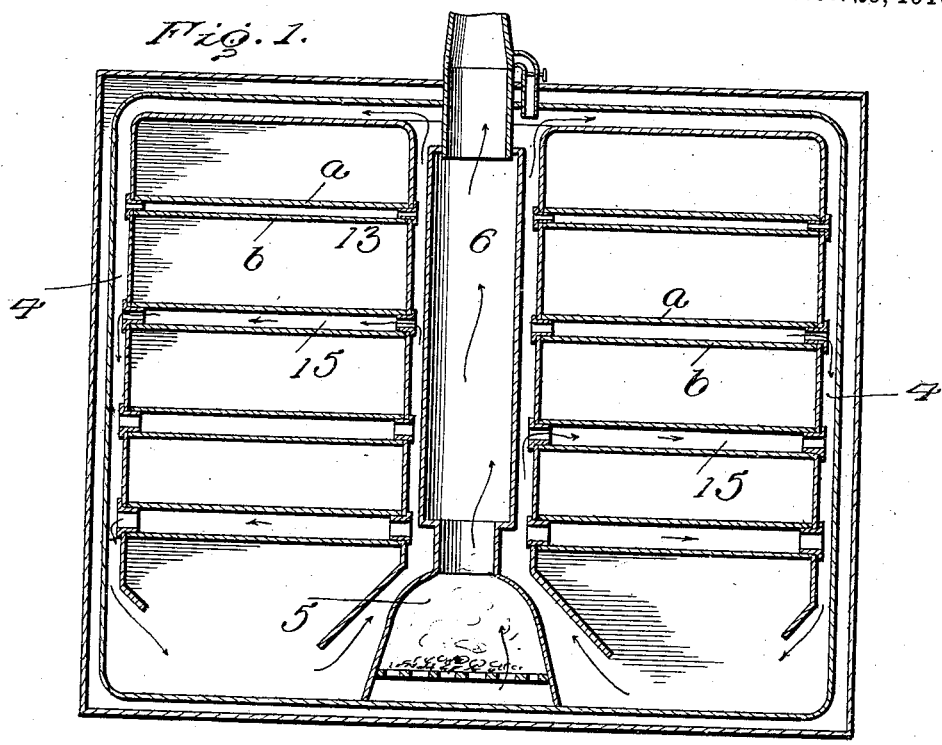
Figure 2:
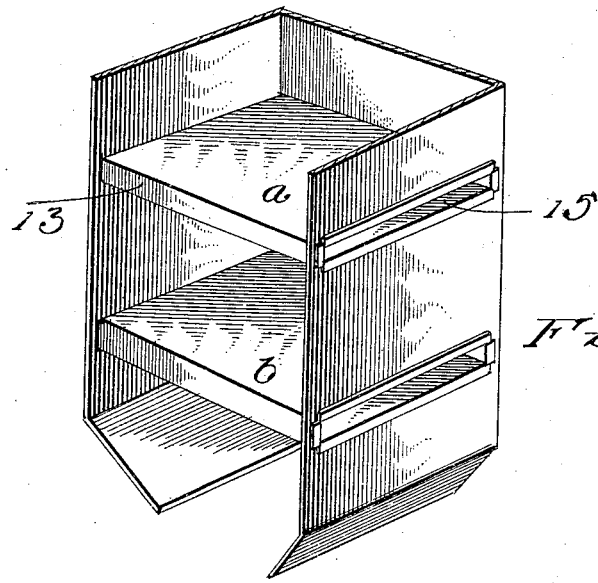

In the accompanying drawing: Figure 1 is a sectional view of one form of oven with which my improvement may be used, the improvement being shown in connection therewith. Fig. 2 is a detached perspective view of that part of the oven which embodies my present improvement.

For the purpose of illustration, I here show my improvement in connection with the construction shown in my Patent No. 873,558 of December 10, 1907, in which there is a continuous hot air flue 4, which surrounds the oven portion which carries the shelves 13. It will be observed that the fire box 5, supplies heat to the surrounding hot air flues and in the construction shown in my said patent with which, for illustrative purposes, I here show my improvement, the smoke flue 6, passes upward at one side of each portion of the oven and, therefore, intermediately arranged in respect to the oven.

My present improvement consists in passing a current of heated air below the supporting shelves 13, and this is accomplished by having the shelves 13 composed of upper and lower walls $a$, $b$, which form between them transverse flues 15, having communication with the aforesaid continuous hot air flue 4. By reason of this construction not only is the bread or other article to be cooked perfectly baked upon its bottom which rests upon the shelf, but also by radiation from the cross-flue 15 of the shelf above, the heat is deflected downward upon the upper surface of the article. This secures a uniformity of color and thoroughness of cooking of the loaf or other article being baked.

The construction in my aforesaid patent has proven to be of great utility, but the present improvement is to increase its utility by providing for the direct radiation of the heat from the hot air flues upon the bottom and top of the article to be baked. These transverse flues provide a more perfect and rapid circulation of the hot air throughout the entire oven and thereby more readily and effectively secure a more even and continuous circulation of hot air throughout every portion of the oven. This circulation in the operation of baking is not only more satisfactory, but is also more economical, and the loaves are better baked without the necessity during the process of baking of shifting their position on the shelves, as is frequently required from time to time in the use of the ordinary supporting shelves. In the use of the ordinary shelves the article being baked is usually shifted from one end of the oven to the other to prevent the over-baking of either the bottom or top, which is an operation often inconvenient for the reason that the baking operation has to be carefully watched, and requires the labor of shifting of the article. By this improved construction of shelf uniform baking is automatically performed, and when the article is removed it will be found to be uniformly baked throughout at both its bottom and top.

It is obvious that this double wall shelf is adapted to be successfully used in connection with all ovens which have a surrounding hot air flue and especially with portable ovens and irrespective of their interior construction so long as the cross-flues are in communication with the hot air from the source of heat.

Attention is called to the fact that the transverse flues 15 gradually decrease in size from the bottom one to the top one, the bottom flue being the largest as shown. This variation more evenly distributes the heat to the various shelves.

Having thus described my invention, what

I claim and desire to secure by Letters Patent is:

1. The combination with an oven having a continuous hot air flue, of double wall supporting shelves forming cross air flues which have their ends communicating with the said continuous air flue, the cross flues gradually diminishing in size from the bottom one to the top one.

2. The combination with an oven having a hot air flue surrounding the same, of box-like supporting shelves extending across the oven and having completely open ends communicating with the air-flue and forming cross-air flues, said shelves gradually diminishing in thickness from the bottom whereby cross air flues of different sizes are produced.

In testimony whereof I do affix my signature in presence of two witnesses.

ALLAN B. KINGSLAND.

Witnesses:
SIMON L. PLATKA,
CHARLES A. MIDDLEBROOK.